No. 757,164. Patented April 12, 1904.

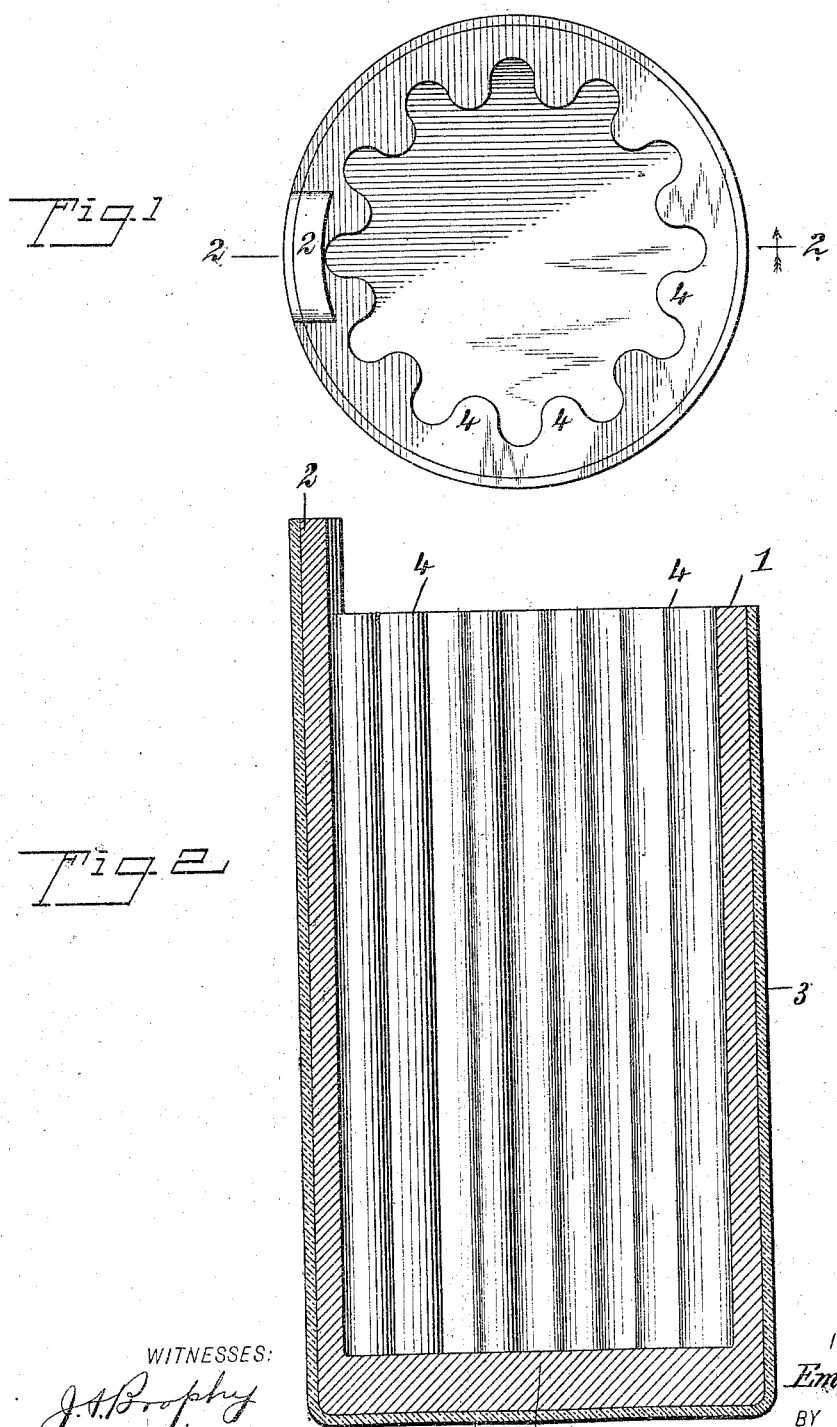

UNITED STATES PATENT OFFICE.

EMERSON WHITMAN, OF LYNN, MASSACHUSETTS.

BATTERY-CELL.

SPECIFICATION forming part of Letters Patent No. 757,164, dated April 12, 1904.

Application filed July 2, 1903. Serial No. 164,063. (No model.)

*To all whom it may concern:*

Be it known that I, EMERSON WHITMAN, a citizen of the United States, and a resident of Lynn, in the county of Essex and State of Massachusetts, have invented a new and Improved Battery-Cell, of which the following is a full, clear, and exact description.

My invention relates to battery-cells admitting of general use, and more particularly to a form of cell serving as a cathode and also as a containing vessel.

Reference is to be had to the accompanying drawings, forming a part of this specification, in which similar characters of reference indicate corresponding parts in both the figures.

Figure 1 is a plan-view of a cell constructed in accordance with my invention, and Fig. 2 is a section of the same upon the line 2 2 in Fig. 1 looking in the direction of the arrow.

The portion 1 of the cell is made of porous carbon and is provided with an upward projection 2, upon which a clamping member may be mounted for the purpose of receiving a wire. The portion 3, of glass, is applied while in a liquid or plastic state and permeates the pores of the carbon portion 1. The effect of the glass is to prevent leakage of the battery fluid through the portion 1 and also to fill the pores of the portion 1. The interior of the carbon 1 is provided with ribs 4 4 for the purpose of increasing the internal surface of the cell, considered in its capacity as an electrode—that is to say, the cell is also the cathode-electrode—and on this account its surface is enlarged by the formation of the ribs 4. The bottom 5 of the cell is rendered comparatively thick, so as to confer greater strength.

I am aware that cathode-plates have heretofore been made of porous carbon and permeated with paraffin, which entered the pores of the carbon, the excess of paraffin upon the surface being removed. I am not aware, however, that glass has been used as a substitute for paraffin in filling the pores of the carbon. Neither am I aware that the substance used for filling the pores of the carbon has been rendered comparatively thick on the exterior thereof, so as to serve as a containing vessel.

Having thus described my invention, I claim as new and desire to secure by Letters Patent—

1. A battery-cell, comprising a substantially cylindrical member of carbon surrounded by a coating of glass.

2. A battery-cell, comprising a substantially cylindrical member of porous carbon surrounded by a coating of glass, said glass permeating the pores of said porous carbon.

3. In a battery-cell, a composite cathode made of carbon and of glass.

4. In a battery-cell, a composite cathode made of porous carbon saturated with glass.

5. In a battery-cell, a receptacle for holding the battery-plate, said receptacle being made of porous conducting material and covered exteriorly with glass.

6. In a battery-cell, the combination of a hollow member of conducting material, and a cylindrical coating of glass encircling said hollow member and adhering thereto.

In testimony whereof I have signed my name to this specification in the presence of two subscribing witnesses.

EMERSON WHITMAN.

Witnesses:
JAMES H. VASSAR,
MARY WHITE VASSAR.